United States Patent [19]
Newlove et al.

[11] Patent Number: 5,948,735
[45] Date of Patent: Sep. 7, 1999

[54] USE OF BREAKER CHEMICALS IN GELLED HYDROCARBONS

[75] Inventors: John C. Newlove, Columbus, Ga.; Cruise K. Jones; Fati Malekahmadi, both of Houston, Tex.

[73] Assignee: Nalco/Exxon Energy Chemicals, L.P., Sugar Land, Tex.

[21] Appl. No.: 08/839,503

[22] Filed: Apr. 14, 1997

[51] Int. Cl.$^6$ .................................. C09K 3/00; E21B 43/27
[52] U.S. Cl. .......................... 507/238; 507/221; 507/227; 507/228; 507/231; 507/244; 507/269; 507/921; 507/922; 166/300; 166/308
[58] Field of Search ...................... 507/921, 238, 507/227, 228, 922, 221, 231, 244, 269; 166/308, 300

[56] References Cited

U.S. PATENT DOCUMENTS

| | | | |
|---|---|---|---|
| 3,163,219 | 12/1964 | Wyant et al. | 166/42 |
| 3,990,978 | 11/1976 | Hill | 252/8.55 |
| 4,147,677 | 4/1979 | Lundberg et al. | 260/23.5 |
| 4,157,432 | 6/1979 | Lundberg et al. | 526/31 |
| 4,442,011 | 4/1984 | Thaler | 252/8.5 |
| 4,741,401 | 5/1988 | Walles et al. | 507/921 |
| 4,919,209 | 4/1990 | King | 166/300 |
| 5,102,558 | 4/1992 | McDougall et al. | 507/921 |
| 5,102,559 | 4/1992 | McDougall et al. | 252/8.551 |
| 5,110,486 | 5/1992 | Manalastas et al. | 507/921 |
| 5,164,099 | 11/1992 | Gupta et al. | 507/921 |
| 5,217,074 | 6/1993 | McDougall et al. | 252/8.551 |
| 5,580,844 | 12/1996 | Swarup et al. | 507/921 |
| 5,604,186 | 2/1997 | Hunt et al. | 507/921 |
| 5,649,596 | 7/1997 | Jones et al. | 507/231 |

*Primary Examiner*—Philip Tucker
*Attorney, Agent, or Firm*—Kelly L. Cummings; Thomas M. Breininger

[57] ABSTRACT

Oil degradable encapsulated breaker particles are used in fracturing operations to break hydro-carbon liquid gelled with salts of alkyl phosphate esters. The preferred breaker chemical is particulate urea coated with sulfonated EPDM.

20 Claims, No Drawings

USE OF BREAKER CHEMICALS IN GELLED HYDROCARBONS

FIELD OF THE INVENTION

The present invention relates generally to the treatment of subterranean formations using gelled hydrocarbons. In one aspect, it relates to the use of breaker chemicals in gelled oil-base fracturing fluids. In another aspect, the invention relates to the use of encapsulated particles of breaker chemicals in fracturing operations.

DESCRIPTION OF THE PRIOR ART

Hydraulic fracturing has been widely used as a means for improving the rates at which fluids can be injected into or withdrawn from subterranean formations surrounding oil wells and similar boreholes. The methods employed normally involve the injection of a viscous fracturing fluid having a low fluid loss value into the well at a rate sufficient to generate a fracture in the exposed formation, the introduction of fluid containing suspended propping agent particles into the resultant fracture, and the subsequent shutting in of the well until the formation is closed on the injected particles. This results in the formation of vertical, high-conductivity channels through which fluids can thereafter be injected or produced. The conductivity in the propped fracture is a function of the fracture dimensions and the permeability of the bed of propping agent particles within the fracture.

In order to generate the fracture of sufficient length, height, and width and to carry the propping agent particles into the fracture, it is necessary for the fluid to have relatively high viscosity. This requires the use of gelling agents in the fracturing fluid.

Fracturing fluids are water-based systems (gelled with water soluble polymers) or oil-based liquids (gelled with in-situ formed reversible networks). The water-based liquids cannot be used in the fracturing of many water sensitive formations. Fracturing in these formations requires the oil-based liquids.

As with all fracturing fluids, the gel or viscosity of the fracturing fluid must be retained for sufficient time to generate the fracture and place the proppant therein, but must eventually be "broken" to permit the well to cleanup. The fracturing fluid accordingly will generally incorporate a "delayed breaker" which, after a pre-determined time or event, activates the breaker to degrade the polymer or gelling agent. Water-based "breakers" are described in SPE Paper 18862. Breakers for oil-based systems are more varied because of the differences in the hydrocarbon viscosifier.

The breaker used in accordance with the present invention is for pH sensitive oil-based gelling agents. By far the most common gelling agents which exhibit pH sensitivity are the phosphate gelling agents. These well known and commercially available gelling agents for oil-based systems are alkyl phosphate esters.

Breaker chemicals useful in oil-based systems include sodium bicarbonate (U.S. Pat. No. 4,877,894), calcium hydroxide, and magnesium hydroxide, and similar bases.

The breaker chemicals may be encapsulated and activated by a variety of mechanisms including crushing by formation closure (U.S. Pat. No. 4,506,734), and dissolution by formation fluids (U.S. Pat. No. 4,741,401 and 5,110,486). U.S. Pat. No. 3,163,219 discloses water-insoluble agents such as rosin asphalts and waxes used as binding agents for sulfur and calcium sulfate gel breakers for water-based systems.

SUMMARY OF THE INVENTION

The method of the present invention involves the use of solid particle breaker chemical coated with an oil degradable rubber coating. The coated particles are introduced into an oil-based fracturing fluid and function as delayed breakers in the fracturing operations. The coated particles exhibit a delayed release of the active chemical (gel breaker) so the degradation or the breaking down of the gelled structure occurs well after the fracturing fluid has been pumped into the formation. Moreover, the breakers are effective within reasonable time periods so that long shut-in times are not required.

The preferred gelling agents for the oil-based liquids are the metal salts of alkyl or orthophosphate esters. These gelling agents are effective viscosifiers in a wide range of oil types, and are most effective when neutralized (i.e. no excess presence of base or acid). In the presence of excess base or acid, the gelled structure is destroyed and the viscosity of the fracturing hydrocarbon is reduced. Acids or bases thus can be used to break the phosphate ester gelling agents. The present invention relies on this mechanism for breaking gels, and employs encapsulated base or acid breaker chemicals.

In a preferred embodiment, the encapsulated breaker comprises:
  (a) a solid particulate chemical capable of breaking gells produced by metal salts of alkyl ortho-phosphate esters, and
  (b) a coating of an oil degradable rubber having a thickness of at least 1 to 100 microns.

The particulate breakers useable in the method of the present invention include particulate urea and metal hydroxides and metal carbonates, and particulate acids and acid anhydrides such as maleic acid and toluene sulfonic acid. Solids such as $Ca(OH)_2$ that are too finely divided to coat discrete particles may be formed into granules comprising a rubber matrix and finely divided breaker solids by the method disclosed in copending application U.S. Ser. No. 08/607,861, (filed Feb. 27, 1996), now U.S. Pat. No. 5,649,596 the disclosure of which is incorporated herein by reference.

The rubber coating is an oil degradable rubber (i.e. rubbers that decompose either by dissolving or dispersing in oil at the temperature of the formation treated). These include sulfonated ethylene-propylene-diene-monomer (EPDM), EPDM, ethylene-propylene copolymer (EPR), polyisobutylene (PIB), butyl rubber (a copolymer of isobutylene and isoprene), styrene-butadiene copolymer (SBR), and block copolymers of styrene and butadiene or isoprene, polybutadiene, polyisoprene, p-methyl styrene-isoprene, sulfonated butyl rubber and blends of these. The preferred rubber is sulfonated EPDM.

The encapsulated particles must have a particle size suitable for fracturing operations. The particles thus will be between about ½ inch to 50 mesh, preferably between about 20 to 50 mesh (U.S. Sieve Series).

In the preferred operations using urea coated with oil degradable rubber, the encapsulated urea particles are introduced into the gelled oil-base fracturing fluid and pumped down the well and into the formation. The urea is shielded from the gelled hydrocarbon by the rubber coating during pumping operations. However, with time and with formation temperature, the oil degrades the rubber, exposing the urea. The urea disrupts the neutralized hydrocarbon causing the gelled structure to break, reducing the viscosity of the oil.

The oil gelled with phosphate ester gelling agents are effective in the absence of excess base or acid. This requires the apparent pH of the liquid to be in the neutral range. In adding the gelling agent to the oil, the pH need not be measured because sufficient gelling of the oil inherently requires the absence of excess base or acid.

The addition of the base or acid breaker chemicals provides an excess base or acid to break the gelled structure.

DESCRIPTION OF THE PREFERRED EMBODIMENTS

The present invention is described and exemplified in connection with the preferred embodiments,—the use of solid base particles (preferably urea) coated with rubber for breaking alkyl phosphate ester gelling agents. It is to be understood, however, that the invention in its broadest concept contemplates the use of acids or bases encapsulated in the oil-degradable rubber. The preferred embodiment is described with specific references to (a) the type of liquid to be gelled, (b) the gelling agent, (c) the coated "breaker" particles, and (d) operations.

(a) Liquid

The hydrocarbon liquid for the fracturing fluid may be any of those currently used in such operations. These include crude oil, refined oil, diesel oil, fuel oil, condensates, and the like. Because of low cost and availability, crude oil and diesel oil are the most common oils used in oil-based fracturing systems.

(b) Gelling Agent

As indicated above, the gelling agent must be capable of increasing the viscosity of the oil and must be pH sensitive. That is, the viscosity increase is optimum at or near neutral acidity. The addition of base "breaker" chemical will provide excess base which causes the gelling agent to degrade, destroying its network structure in the oil. This returns the oil to a low viscosity (ungelled) state, permitting well cleanup.

The metal salts of partially esterified phosphates are known to be pH sensitive gelling agents. See, for example, U.S. Pat. No. 4,877,894 which discloses a commercial alkyl phosphate acid-ester marketed as "ASP-160", by Nalco Chemical Company (now NALCO/EXXON ENERGY CHEMICALS, L.P.). This patent also discloses an improved alkyl phosphate ester geller and a delayed "breaking agent" (sodium bicarbonate). The disclosure of U.S. Pat. No. 4,877,894 is incorporated herein by reference.

Specific alkyl phosphate ester gelling agents include $C_{3-18}$ (preferably $C_{6-10}$) alkyl diester acids, $C_{8-10}$ alkyl diester acid, mixtures of the above, and analogous mono and diesters. These additives are known in the industry, and many are commercially available. The gelled structure in the oil is developed by mixing the alkyl phosphate ester with a basic aluminum component such as sodium aluminate, selected aluminum alkoxides, and aluminum acetate. Sodium aluminate is the preferred base compound.

One method for making alkyl phosphate esters or diesters involves reacting aliphatic alcohols having from 3 to 18, (preferably 6 to 10) carbon atoms with phosphorous pentoxide. The phosphate intermediate then may interchange its ester groups with triethyl phosphate with triethylphosphate producing a more broad distribution of alkyl phosphate esters.

(c) Encapsulated Breaker Particles

The encapsulated breakers in the preferred embodiment comprise a solid alkaline compound (base) coated with a degradable rubber.

The rubber may be natural or synthetic and must possess the following properties:

(i) capable of being coated onto a particulate substrate, (ii) sufficiently oil degradable under conditions of use to release the breaker chemical after a pre-selected delay time following fracturing fluid placement.

The preferred rubbers will be selected from the following different chemical classes: sulfonated ethylene propylene-diene monomer (EPDM), EPDM, ethylene-propylene copolymer (EPR), polyisobutene (PIB), Butyl rubber (a co-polymer of isobutylene and isoprene), sulfonated butyl rubber, styrene-butadiene copolymer (also known as SBR rubber), block polymers of styrene and butadiene or isoprene (which can be hydrogenated or non hydrogenated) offered by Shell Chemical Co. under the Kraton trademark, polybutadiene, polyisoprene and blends of these. It is readily understood in the art that these polymers are comprised of different molecule weight molecules so that there is a wide distribution of molecular weights. This is often characterized by molecular weight distribution ratios such as the ratio of Weight to Number average. This invention includes those polymers of said ratios of from >1.0 to 10. Those preferred elastomers are classified as AA by ASTM D2000-SAE J200 indicating low resistance to oil. (Unless otherwise indicated, molecular weights are number average molecular weights.)

A description of these elastomers is provided in The Kirk Othmer Concise Encyclopedia of Chemical Technology, published by John Wiley & Sons, 1985, page 391 forward, the disclosure of which is incorporated herein by reference.

Unlike most of the other high molecular weight polymers contemplated in this invention, PIB is a low molecular weight polymer primarily prepared from iso-butylene. Due to the raw materials employed, it also often contains other comonomers such as butene-1, and butene-2; however, the major component is isobutylene. This oligomer typically ranges in number average molecular weight from 300 to 10,000, preferably 900 to 5,000, and most preferably 900 to 2,500; and is used commercially in a variety of applications such as an important raw material for motor oil additives.

The preferred rubber is sulfonated EPDM (ethylene propylene-diene elastomers).

The sulfonated (sulfo) elastomeric polymers which are preferred for the purposes of this invention are water insoluble and include sulfonated copolymers of ethylene and propylene, sulfonated terpolymers of ethylene, propylene and a diene, preferably a non-conjugated diene (EPDM), sulfo Butyl rubber, sulfo isoprene/styrene rubber, sulfo isoprene/butadiene rubber, sulfo isoprene/butadiene/styrene copolymers, sulfo isobutylene/styrene copolymers, sulfo isobutylene/paramethyl styrene copolymers, and complexes of the aforementioned polymers with a nitrogen containing polymer such as vinyl pyridine, vinyl pyridine copolymer of styrene, alkyl acrylates, and alkyl methacrylates.

The more preferred neutralized sulfonated elastomers of the instant invention are selected from the group consisting of sulfonated Butyl rubber, sulfonated EPDM terpolymer and a complex of sulfonated EPDM terpolymer with a vinyl pyridine copolymer.

The preferred EPDM for use in the present invention is from 40 to 90 mole percent of ethylene, from 20 to 70 mole percent of propylene, and from 1 to 20 mole percent of the diene monomer. The dienes include 5-ethylidene-2-norbornene, 1,4-hexadiene, 5-phenyl-2-norbornene and dicyclopentadiene. As stated in the *ENCYCLOPEDIA OF POLYMER SCIENCE AND ENGINEERING*, Vol. 6, pp. 522–523, ethylene-propylene elastomers are made from the basic building blocks of ethylene and propylene and may be combined with a third, or even a fourth, monomer to provide the olefinic sites along the backbone. The term "EPDM elastomers" includes terpolymers and tetrapolymers that include at least monomers of ethylene, propylene, and diene. The preferred EPDM elastomers (ethylene/propylene/5-ethylidene-2-norbornene) have about 0.5 to about 20 wt % 5-ethylidene-2-norbornene monomer, about 30 to 70 wt % ethylene, with the balance of the polymer being propylene. A typical ethylene/propylene/5-ethylidene-2-norbornene terpolymer has an ethylene content of about 50 wt % and a 5-ethylidene-2-norbornene content of about 5 wt %. The terpolymers useful in the present invention have a number average molecular weight (Mn), as measured by GPC, of 10,000 to 250,000, preferably of 20,000 to 100,000. All polymer molecular weights quoted herein are number average molecular weights unless otherwise indicated. The Mooney viscosity (ML 1+8, 100° C.) of the terpolymer is about 5 to about 90, more preferably of about 10 to about 80, and most preferably about 20 to about 80. The EPDM should have a low crystallinity (<50%) and preferably less than 30%. The degree of crystallinity and molecular weight ranges are particularly important. Medium to low crystallinity is preferred because these polymers require less energy to each a flux state during mixing. EPDM terpolymers useful in the present invention are commercially available in a variety of grades from a number of manufacturers, including Exxon, Uniroyal, Dupont, DSM Copolymer, and Polysar, to name a few.

The water insoluble sulfonated polymers will comprise from about 4 to about 200 milliequivalents of pendant sulfonate groups per 100 grams of polymer, more preferably from 10 to 100 meq. pendant sulfonate groups. If low molecular weight ethylene-propylene-diene monomer terpolymer is employed, i.e. Mn 10,000 to 20,000, then higher sulfonate contents will be needed to effect the same results as a comparable lower sulfonated higher Mn (100,000 or higher) e-p-terpolymer. That is, sulfonate content (ionic associations) acts similar to chain entanglements. In lower Mn e-p-terpolymers, less chain entanglements are present than in higher Mn e-p-terpolymers, thus the lower Mn e-p-terpolymers require higher sulfonate levels to affect similar physical properties.

The sulfonated elastomers utilized in the instant invention are neutralized with transition elements selected from Groups IVA, VA, VIA, VIIA, VIIIA, IB, and IIB of the Periodic Table of Elements and lead, tin, and antimony, as well as ammonium and amine counterions. Zinc and sodium neutralizing ions (as ionic salts, e.g. acetate or hydroxide) are preferred.

Neutralization of the cited polymers with appropriate metal hydroxides, metal acetates, metal oxides or ammonium hydroxide, etc. can be conducted by means well known in the art. For example, the sulfonation process as with Butyl rubber, containing a small 0.3 to 1.0 mole percent unsaturation, can be conducted in a suitable solvent, such as toluene, with acetyl sulfate as the sulfonating agent such as described in U.S. Pat. No. 3,836,511, incorporated herein by reference. The resulting sulfonic acid derivative can then be neutralized with a number of different neutralization agents such as sodium phenolate and similar metal salts. The amounts of such neutralization agents employed will normally be stoichiometrically related to the amount of free acid in the polymer. It is preferred that the amount of neutralizing agent employed is in an excess percent to ensure full neutralization. The use of an excess of such neutralization agent is necessary to effect at least 50 percent neutralization of the sulfonic acid groups present in the polymer, preferably at least 90 percent, and most preferably essentially complete neutralization of such acid groups should be effected.

Thus, the degree of neutralization of said sulfonate groups may vary from 50 to 100 mole percent. With the utilization of neutralized sulfonates in the instant invention, it is preferred that the degree of neutralization be substantially complete, that is, with no substantial free acid present and without substantial excess of the base, other than that needed to ensure neutralization. The neutralized sulfonates possess greater thermal stability compared to their acid form and are ionically cross-linked. Thus it is clear that the polymers which are normally utilized in the instant invention comprise substantially neutralized pendant groups and, in fact, an excess of the neutralizing material may be utilized without defeating the objects of the instant invention.

The sulfonated elastomer polymers of the instant invention may vary in number average molecular weight from 1,000 to 1,000,000 preferably 10,000 to 300,000 most preferably from 10,000 to 200,000. These polymers may be prepared by methods known in the art, for example, see U.S. Pat. No. 3,642,728, incorporated herein by reference.

The most preferred sulfonated polymers for use in the instant invention are sulfonated ethylene/propylene terpolymers which may be prepared by the procedures described in U.S. Pat. No. 3,870,841, incorporated herein by reference.

The sulfonated polymers for use in the present invention may be neutralized prior to incorporation into organic solvent or by neutralization of the acid form in situ. For example, preferably the acid derivative is neutralized immediately after preparation. For example, if the sulfonation of an EPDM terpolymer is conducted in solution, then the neutralization of that acid derivative can be conducted immediately following the sulfonation procedure. The neutralized polymer may then be isolated by means well known to those skilled in the art, i.e. coagulation, steam stripping, or solvent evaporation, because the neutralized polymer has sufficient thermal stability to be dried for employment at a later time in the process of the instant invention. It is well known that some unneutralized sulfonic acid derivatives do not possess good thermal stability and the above operations avoid that problem. The sulfonated polymer may also be sprayed onto the breaker chemical directly from the synthetic solution without isolation from the solvent.

The coating components of the present invention are dissolved in an organic solvent to form a solution with a concentration level of about 0.1 to 20 wt %, more preferably from about 0.5 to about 10.0 wt % and most preferably from about 0.5 to about 6.0 wt %. The solvent system comprises an organic solvent with or without a polar cosolvent, such as alcohol or amine. The solvent can be an organic liquid which is capable of dissolving the polymeric backbone. A cosolvent may be needed to break up associated domains resulting from aggregation of ionic species.

As discussed above, a variety of polymer backbones will display the desirable properties discovered in this invention.

Specific examples of organic liquids to be employed as solvents for the polymers include:

| Polymer | Organic Liquid |
|---|---|
| Sulfonated ethylene-propylene terpolymer | aliphatic and aromatic solvent oils such as Solvent "100 Neutral", "150 Neutral", and similar oils, benzene, diesel oil, toluene, xylene, ethyl benzene, pentane, hexane, heptane, octane, |

| Polymer | Organic Liquid |
| --- | --- |
| | isooctane, nonane, decane, and ketone solvents. |

In order to reduce the viscosity of the organic hydrocarbon solution of the sulfonated polymer so as to be able to employ the organic hydrocarbon solution in a fluidized bed process, a polar cosolvent may be added to the organic hydrocarbon solution of the sulfonated elastomeric polymer to solubilize the pendant ionomeric groups. The polar cosolvent will have a solubility parameter of at least 10.0, more preferably at least 11.0, and may comprise from 0.0001 to 15.0 wt %, preferably 0.001 to 5.0 wt %, of the total mixture of organic liquid, water insoluble ionomeric polymer and polar cosolvent.

Normally, the polar cosolvent will be a liquid at room temperature. However, this is not a requirement. It is preferred, but not required, that the polar cosolvent be soluble or miscible with the organic liquid at the levels employed in this invention. The polar cosolvent may be selected from the group consisting of alcohols, amines, ammonia, di- or tri-functional alcohols, amides, acetamides, phosphates, or lactones and mixtures thereof. Especially preferred polar cosolvents are aliphatic alcohols such as methanol, ethanol, no-propanol, iso-propanol, 1,2-propane diol, monoethyl ether of ethylene glycol and n-ethylformamide.

The coating of any solid particulates can be achieved by applying the organic solution of the sulfonated polymer, optionally containing the covalent cross-linking agent, over the substrate at an ambient temperature of 10°–70° C. Where the solution contains a cross-linking agent, care should be taken to insure that the application temperature is significantly lower than the temperature at which the covalent cross-linking agent is activated. Coating is achieved by either dip coating or spray coating onto a cascading stream of granules through an appropriate technique such as fluidized bed coating. Examples of fluidized bed coating processes are conventional spray coating wherein the solid particulates are coated by spraying the coating solution above or below the bed in a Wurster configuration or a fluidized bed with a rotating bed support plate. It is envisioned that coated solid inorganic or organic breaker systems (acid or base) can be utilized in a variety of environmental conditions and yet the release of the breaker can be controlled in such a way that they are available when the reduction of viscosity is needed.

After the coating solution is applied, the organic solvent solution is dried by evaporation with or without the aid of forced drying gas, such as air-or-nitrogen gas. The drying gas temperature can be from ambient temperature up to the boiling point or the organic solvent system. Preferably the temperature of the drying gas is between 20° C. to 100° C. The most preferred temperature of the drying gas should be from about 50° to about 70° C. for fast evaporation of the organic solvent system. After drying, the thickness of the applied coating should be about 1 micrometer to about 100 micrometers. The preferred coating thickness should be about 5 to about 80 micrometers, and the most preferred 5 to 50 microns for both performance and economic reasons. To control the quality of the applied coating, the solution concentration of the sulfonated polymer should be within the 0.1 to 20 wt % range set forth above.

The coatings can be applied in single or multiple layers, depending on the desired coating thickness. In any event, the organic solvent system is evaporated after each layer of application. The sulfonated polymer coating can be applied over the substrate of interest or over a previous coating. In the latter case, such practice can modify or improve the performance of the coated system.

Specific examples of preferred breaker chemicals of the instant invention are selected from the group consisting of inorganic bases: urea, metal hydroxides, and carbonates. (The preferred metals are Na, Ca, K, and Mg.) Organic bases include amines and amides.

The release of the breakers from the coated solid breaker system can be controlled by the thickness of the rubber coating and the degree of degradability of the rubber coating. When using the breaker release such as the degree of sulfonated polymers for the coating, other factors affect sulfonation of the polymer, the degree of neutralization of the sulfonated groups of the sulfonated polymers, the type of cation in the sulfonated polymer, the biodegradability of the sulfonated polymers, and the intrepidity and conformity of application of the polymers.

In another embodiment of the invention, the encapsulated breaker chemical may be further overcoated by processes described above with a solution of thermoplastic polymer material which exhibits permeability properties similar to those of the ionically and covalently cross-linked neutralized elastomer coating overlaying the breaker chemical. This overcoat layer is particularly useful in reducing the tackiness of the elastomer layer and thereby allows for the application of a thicker elastomer layer. For example, a sulfonated EPDM elastomer layer may become tacky during the coating process and the coated particles tend to stick together. The application of an overcoat layer of thermoplastic polymer removes the tackiness of the previously coated particles so that thicker layers of the sulfo EPDM coating may be achieved.

Preferred thermoplastic overcoat layers are based on sulfonated styrene polymers or copolymers which are also neutralized to the degree set forth above with respect to the elastomeric polymers. The thickness of the thermoplastic layer is generally less than the thickness of the elastomeric layer, and may range from about 1 to about 20 microns, more preferably from about 1 to about 10 microns, and most preferably from about 1 to about 5 microns.

Thermoplastic polymers which are most preferred as overcoat layers in accordance with this invention include neutralized sulfonated poly-styrene and neutralized sulfonated poly (p-methyl) styrene having a degree of acid neutralization and a molecular weight within the ranges specified above for the elastomeric polymer.

The coating of any solid particulates such as the breaker chemical with the protective layer can be achieved by spraying in a fluidized bed process a solution of protective layer onto a cascading stream of granules to be coated, and drying said granules, to achieve a protective sealing layer thickness within the range of from about 1 to about 30 microns. The coated granules may then be subsequently overcoated with the elastomer using a solution of the elastomer in appropriate solvent.

The preferred breaker chemicals which may be encapsulated in accordance with this invention include urea and calcium hydroxide.

The breaker chemical can also be used in combination with a polymeric matrix as described in U.S. Pat. No. 4,738,897, incorporated herein by reference, absorbed on a porous solid such as diatomaceous earth or coated on an inert core substrate such as urea as described above, or with a rubber matrix described in copending application U.S. Ser. No. 08/607,861, filed Feb. 27, 1996, U.S. Pat. No. 5,649,596.

(d) Operations

In carrying out the fracturing operations, the gelling agent, liquid hydrocarbons, basic aluminum compounds, solid additives (proppants), and breaker granules are blended in frac tanks at the well site, by either a batch, semi-continuous or continuous process to produce the gelled hydrocarbon. Once the fracturing operations are begun, the gelled hydrocarbon suspension is pumped from the mixing tanks and pumped down the well bore at the desired formation fracturing pressure and out into the formation fracture. The target formation may be kept under elevated pressure for up to several hours to promote further propagation of cracks. Therefore, it is desirable that the gelled hydrocarbon viscosity remain stable in the temperature range of about 0–10° F. to about 150° F. for several hours.

Once the fracturing operation is complete, the pressure on the hydraulic fracturing fluid is released. The hydrocarbon liquid or formation fluids degrade (i.e. dissolve or disperse) the rubber coating exposing the breaker chemical to the gelled hydrocarbon. The time of delay, of course, will depend on several factors, including oil solubility or dispersibility of the rubber matrix, temperature, loading of the breaker chemical in the granules, and the effect of the breaker chemical on the gelled structure.

Normally the treatment should be designed to provide a delay of from 8 to 24 hours beginning with their introduction into the frac fluid. Note that the effect of the breaker chemical may commence earlier (e.g. one hour after introduction into the fluid) but will only gradually reduce the viscosity of the frac fluid over the design delay period.

The fracturing fluid may also include other additives such as corrosion inhibitors, surfactants, etc.

The following represents a typical oil based treating liquid system of the present invention:

|  | Concentration in the Oil | |
| --- | --- | --- |
|  | Preferred | Most Preferred |
| Phosphate Ester gelling agent | 5–30 gptg[1] | 7–15 gptg |
| Sodium aluminate | 1–10 gptg | 1–3 gptg |
| Coated breaker particles | 1–20 pptg[2] | 5–10 pptg |

[1]gallon per thousand gallons
[2]pounds per thousand gallons

Urea particles coated with sulfonated EPDM are commercially available from Sherrit, Inc. under the trade designation of DURATION TYPE 180.

Alternate Embodiment

The present invention has been described in detail in connection with alkaline breaker chemicals. As noted above, the same principles and mechanisms are involved when using excess acid or acid anhydride breaker chemicals coated with the oil degradable rubber. Solid particles of acid or acid anhydrides can be coated with the rubber as described previously.

Suitable acid or acid anhydride chemicals capable of breaking the alkyl phosphoric gelling agents include $C_3-C_{30}$ alkyl dianhydrides, aromatic acids (benzoic acid), acidic clays, maleic acid, maleic anhydride copolymer, and p-toluene sulfonic acid, with benzoic acid being preferred.

The amount of the acid or anhydride particles coated by the rubber may be within the ranges described above.

EXAMPLE

The following example demonstrates the effectiveness of rubber coated urea as a delayed breaker. The rubber coated urea was obtained from Sherrit, Inc. under the trade designation DURATION TYPE 180. The properties and composition of the particles were as follows:

| Mesh: | 16 (U.S. Sieve Series) |
| --- | --- |
| Rubber: | Sulfonated EPDM |
| Wt % Coating: | 2–3% based on the weight of the urea |
| Thickness: | Approximately 25 microns |

The rubber was zinc-neutralized sulfonated EPDM (approximately 25 meq. sulfa/100 g. polymer). The terpolymer was approximately 50/45/5 (by wt.) of ethylene/propylene/ethylidene norbornene and had a number average molecular weight to approximately 56,000.

Test Procedure

Two batches of particles were prepared as follows:
(a) 198 mls of red diesel oil and 2.0 mls (1%) of deionized water were placed in a blender container;
(b) 1.40 mls of a $C_8$ to $C_{10}$ phosphate diester[1] was slowly added to the container with slow stirring;
(c) 0.21 mils of 45 wt % aqueous sodium aluminate was added dropwise to the container, followed by high stirring for 3 minutes;
(d) at the end of the 3 minutes of rapid stirring, a 60% breaker was added to each batch (along with 1% water). In batch I, the breaker was uncoated urea particles, and in batch II, the breaker was coated urea particles (DURATION TYPE 180). The stirring of each was continued for 2 minutes.

[1]Marketed by NALCO/EXXON as AST 160

Each batch was transferred to a separate Fann 50 viscometer and mixed at 250° F. and 100 rpm for 12-1/1 hrs. The urea particles in the uncoated form (or as a precurser for the coated form urea) were uniform and substantially identical.

The test results were as follows:

Batch I (uncoated urea particles):
During the first 20 minutes, the viscosity peaked at about 270 cps and thereafter continuously declined to about 75 cps after about 12.5 hours. Significantly, the loss of viscosity occurred after only 20 minutes, indicating the early action of the urea on the gelled oil.

Batch II (coated urea particles):
The viscosity increased to a maximum of about 300° F. and did not begin to fall off until after about 2 hours. The viscosity declined gradually until the end of the test (12.5 hours) reaching a minimum of about 140 cps.

The significance of this test is that the viscosity did not begin declining until after about 2 hours and only gradually declined thereafter in almost uniform rate per hours. For example, the viscosity after 5 hours for the Batch II Test was over 83% of the maximum viscosity, whereas the viscosity after 5 hours for the Batch I Test was only about 41% of the maximum viscosity.

What is claimed is:

1. In a method of fracturing a subterranean formation wherein a hydrocarbon liquid gelled with a pH sensitive alkyl phosphate ester gelling agent is pumped into the formation, the improvement wherein the hydrocarbon liquid has dispersed therein a coated breaker chemical comprising a particulate acid or base chemical, said chemical being capable of breaking the alkyl phosphate gelling agent, said base or acid breaker particles being coated with a coating consisting of an oil-degradable rubber.

2. In a method of fracturing a subterranean formation wherein a hydrocarbon liquid gelled with a pH sensitive alkyl phosphate ester gelling agent is pumped into the formation, the improvement wherein the hydrocarbon liquid has dispersed therein a breaker chemical comprising solid particulate breaker chemical selected from base compounds, said particles being coated with a coating consisting of a rubber degradable by said hydrocarbon liquid whereby the breaker chemical is shielded from the hydrocarbon liquid during the fracturing operation but upon degradation of the rubber coating under formation conditions exposes the breaker chemical to the gelled liquid and converts the gelled liquid to a lower viscosity liquid.

3. The method of claim 2 wherein the rubber degrades as a result of dissolving or dispersing in the hydrocarbon liquid.

4. The method of claim 2 wherein the alkyl phosphate ester is a diester and the alkyl groups thereof each have from 6 to 10 carbon atoms.

5. The method of claim 2 wherein the amount of base chemical is such to degrade or destroy the gelled structure of the hydrocarbon and reduce its viscosity by at least 40% in about 2 hours.

6. The method of claim 2 wherein the base chemical is selected from the group consisting of urea, metal hydroxides, and carbonates.

7. The method of claim 6 wherein the base chemical is particulate urea.

8. The method of claim 2 wherein the rubber is selected from natural rubber, sulfonated EPDM, EPDM, PIB, SBR, EPR, p-methyl styrene-isoprene, and mixtures thereof.

9. The method of claim 2 wherein the rubber coating is 1 to 100 microns thick.

10. The method of claim 2 wherein the coated particles are less than 30 mesh in size.

11. The method of claim 2 wherein the oil-degradable rubber shields or partially shields the breaker chemical in the hydrocarbon liquid for at least 1 hour.

12. The method of claim 2 wherein the elastomeric polymer is selected from the group consisting of sulfonated copolymers of ethylene and propylene, sulfonated terpolymers of ethylene, propylene and a diene, sulfonated Butyl rubber, sulfonated isoprene/styrene rubber, sulfonated isoprene/butadiene rubber, sulfonated isoprene/butadiene/styrene copolymers, sulfonated isobutylene/styrene copolymers, sulfonated isobutylene/para methyl styrene copolymers, and complexes of the aforementioned polymers with a vinyl pyridine, vinyl pyridine copolymer of styrene, alkyl acrylates, and alkyl methacrylates.

13. The method of claim 12 wherein said sulfonated elastomeric polymer is a neutralized sulfonated EPDM terpolymer.

14. The method of claim 12 wherein the acid groups of said sulfonated elastomeric polymer are at least about 50% neutralized.

15. The method of claim 12 wherein the acid groups of said sulfonated elastomeric polymer are about 100% neutralized.

16. The method of claim 12 wherein the acid groups of said sulfonated elastomeric polymer are neutralized with an ion selected from the group consisting of zinc or sodium.

17. The method of claim 13 wherein said EPDM terpolymer contains copolymerized ethylidene norbornene.

18. The method of claim 2 wherein said coating has thickness in the range of from about 5 to about 50 microns.

19. A method of fracturing a subterranean formation with an oil based fracturing fluid which comprises:
   (a) gelling a hydrocarbon liquid by adding an alkyl phosphate ester gelling agent to the hydrocarbon liquid;
   (b) adding an aluminum compound to the liquid hydrocarbon to react with the gelling agent and form a salt of the alkyl phosphate ester which gels the hydrocarbon liquid;
   (c) adding free flowing encapsulated gell breaker particles having an average particle size of 30 mesh or smaller to the hydrocarbon liquid, said particles comprising a core of particulate urea coated with a coating consisting of an oil-degradable sulfonated EPDM rubber;
   (d) pumping the gelled hydrocarbon liquid containing the encapsulated particles into the formation at a rate and pressure sufficient to form a fracture therein;
   (e) shutting in the well whereby the hydrocarbon liquid degrades a portion at least of the rubber coating releasing the urea to react with the salt of the alkyl phosphate ester and reduce the viscosity of the gelled hydrocarbon liquid.

20. The method of claim 19 wherein the delayed release of the base chemical commences at a time period not less than 1 hour after introduction into the liquid hydrocarbon.

* * * * *